United States Patent
Yao et al.

(10) Patent No.: US 10,927,230 B2
(45) Date of Patent: Feb. 23, 2021

(54) METHOD FOR PREPARING COMPOSITE MATERIALS

(71) Applicant: City University of Hong Kong, Kowloon (HK)

(72) Inventors: Xi Yao, Kowloon (HK); Wenqing He, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 15/880,602

(22) Filed: Jan. 26, 2018

(65) Prior Publication Data
US 2019/0233608 A1 Aug. 1, 2019

(51) Int. Cl.
| B05D 3/00 | (2006.01) |
| B05D 1/26 | (2006.01) |
| B05D 1/18 | (2006.01) |
| B05D 5/04 | (2006.01) |
| C08J 9/36 | (2006.01) |
| C09D 11/50 | (2014.01) |
| C09D 11/03 | (2014.01) |
| C08J 9/00 | (2006.01) |
| C10M 101/00 | (2006.01) |
| C10N 20/02 | (2006.01) |

(52) U.S. Cl.
CPC .............. *C08J 9/365* (2013.01); *B05D 1/18* (2013.01); *B05D 1/26* (2013.01); *B05D 3/007* (2013.01); *B05D 5/04* (2013.01); *C08J 9/0066* (2013.01); *C08J 9/36* (2013.01); *C09D 11/03* (2013.01); *C09D 11/50* (2013.01); *C10M 101/00* (2013.01); B05D 2201/00 (2013.01); B05D 2259/00 (2013.01); B05D 2301/00 (2013.01); C08J 2323/26 (2013.01); C10M 2203/003 (2013.01); C10N 2020/02 (2013.01)

(58) Field of Classification Search
CPC ... C08J 9/365; C08J 9/36; C08J 9/0066; C08J 2323/26; C10M 101/00; C10M 2203/003; B05D 1/18; B05D 1/26; B05D 3/007; B05D 5/04; B05D 2201/00; B05D 2259/00; B05D 7/22; B05D 2301/00; C08K 3/015; C08K 5/0058; C10N 2220/022; C10N 2030/16
USPC ..... 106/15.05; 427/230, 243, 244, 245, 258, 427/334, 417, 430.1, 443
See application file for complete search history.

(56) References Cited

U.S. PATENT DOCUMENTS

| 6,156,287 A | 12/2000 | Ko |
| 7,517,536 B2 | 4/2009 | Ko |
| 7,687,433 B2 | 3/2010 | Ko |
| 2006/0248767 A1* | 11/2006 | Hofer ..................... A61L 15/46 40/633 |
| 2011/0039043 A1* | 2/2011 | Klemann ............... B41M 5/502 428/32.37 |
| 2011/0232653 A1 | 9/2011 | Imashiro et al. |
| 2015/0196940 A1* | 7/2015 | Aizenberg ............... B05D 5/08 428/141 |
| 2016/0032074 A1* | 2/2016 | Aizenberg ............ A61L 29/085 514/772.4 |
| 2017/0022371 A1* | 1/2017 | Lynn .................... C09D 5/1625 |
| 2018/0230318 A1* | 8/2018 | Lynn ....................... C09D 5/14 |

FOREIGN PATENT DOCUMENTS

| CN | 101228885 | 7/2008 |
| CN | 101912167 | 12/2010 |
| CN | 102391364 | 3/2012 |

OTHER PUBLICATIONS

Nosonovsky, Michael, "Slippery when wetted," Nature, vol. 477, Sep. 22, 2011, 412-413. (Year: 2011).*
Epstein et al., "Liquid-infused structured surfaces with exceptional anti-biofouling performance," PNAS, vol. 109, No. 33, Aug. 14, 2012, 13182-13187. (Year: 2012).*
Kim et al., "Liquid-Infused Nanostructured Surfaces with Extreme Anti-Ice Performance and Anti-Frost Performance," ACSNano, Vo . 6, No. 8, 2012, 6569-6577. (Year: 2012).*
Li et al., "Hydrophobic Liquid-Infused Porous Polymer Surfaces for Antibacterial Applications," ACS Appl. Mater. Interfaces, 2013, 5, 6704-6711. (Year: 2013).*
Levkin et al., "Porous Polymer Coatings: a Versatile Approach to Superhydrophobic Surfaces," Adv. Funct. Mater. 2009, 19, 1993-1998. (Year: 2009).*
Manna et al., "Slippery Liquid-Infused Porous Surfaces that Prevent Microbial Surface Fouling and Kill Non-Adherent Pathogens in Surrounding Media: A Controlled Release Approach," Adv. Funct. Mater. 2016, 26, 3599-3611. (Year: 2016).*
Kratochvil et al., "Slippery Liquid-Infused Porous Surfaces that Prevent Bacterial Surface Fouling and Inhibit Virulence Phenotypes in Surrounding Planktonic Cells," ACS Infect. Dis. Jul. 8, 2016; 2(7): 509-517. (Year: 2016).*
Manna et al., "Fabrication of Liquid-Infused Surfaces Using Reactive Polymer Multilayers: Principles for Manipulating the Behaviors and Mobilities of Aqueous Fluids on Slippery Liquid Interfaces," Adv. Mater. 2015, 27, 3007-3012. (Year: 2015).*

\* cited by examiner

*Primary Examiner* — William P Fletcher, III
(74) *Attorney, Agent, or Firm* — Renner Kenner Greive Bobak Taylor & Weber

(57) ABSTRACT

A method of preparing a composite includes providing a porous material including a polymeric network and a polar particle; depositing an ink onto the porous material via a printing process; and delivering a lubricating fluid to the porous material to form a coating. A composite is obtained from the method, and an anti-fouling product including the composite is provided.

9 Claims, 15 Drawing Sheets

(1 of 15 Drawing Sheet(s) Filed in Color)

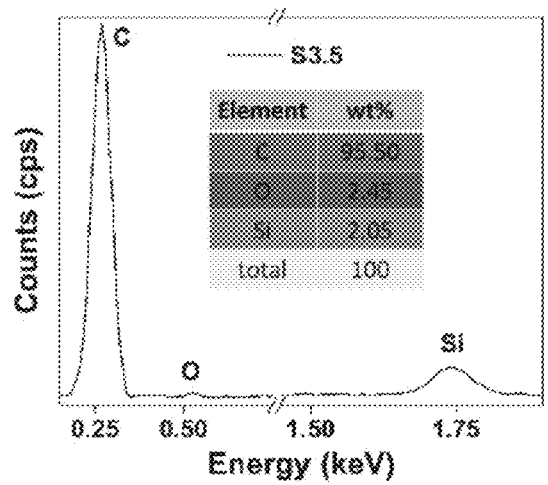
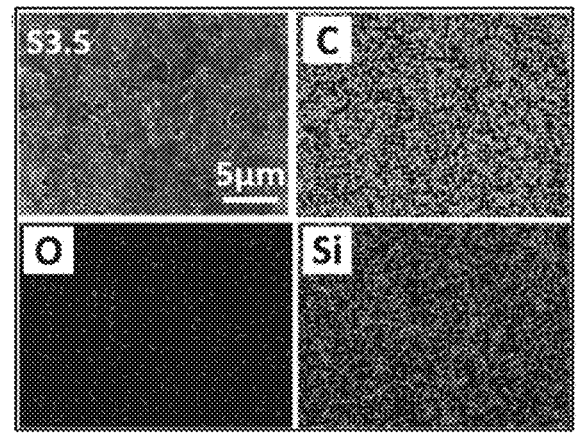
Fig. 4d
Fig. 4e
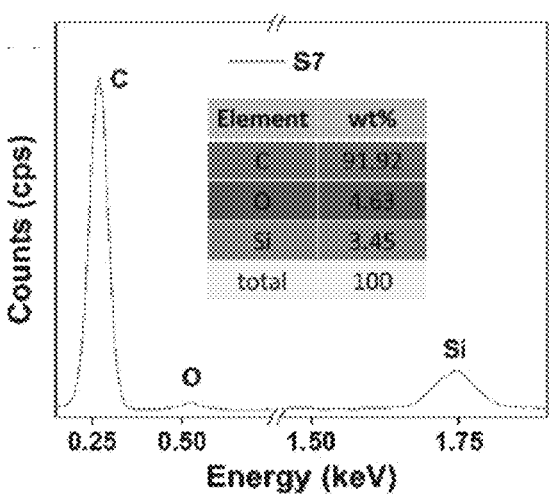
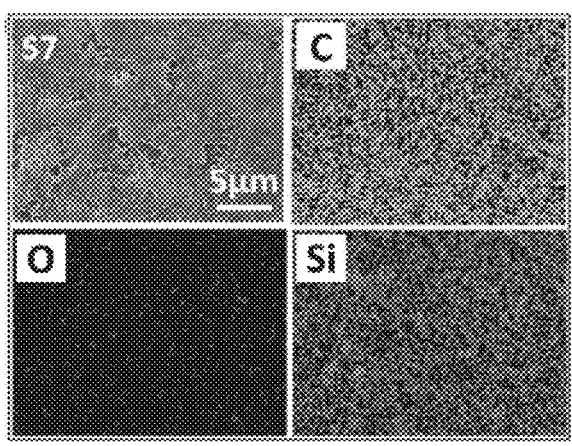
Fig. 4f
Fig. 4g

METHOD FOR PREPARING COMPOSITE MATERIALS

TECHNICAL FIELD

The present invention relates to a composite and a method of preparing it, particularly but not exclusively a composite loaded with an ink and a method of preparing it.

BACKGROUND OF THE INVENTION

Liquid-infused materials (LIMs) with extreme surface slipperiness are widely used in applications which require self-cleaning and oil-water separation, droplet transportation, anti-corrosion and anti-icing coating, anti-fouling and applications in biomedical fields. There is a growing demand for LIMs. The future developments on LIMs are LIMs having appropriate combinations of surface slipperiness and specific physicochemical properties such as optical tunability, mechanical robustness, chemical and biological activities to achieve multiple effects and synergize for optimal performance. For example, LIMs made from lubricant swollen polymers or elastomers could bring together surface slipperiness and desired functionality from the polymers or elastomers such as stimuli-responsiveness, shape memory or even self-healing which could largely extend their application scope. Moreover, LIMs developed from photocatalytic oxides coatings could combine the surface slipperiness and bactericidal effect for improved anti-biofouling. One challenge in designing multifunctional LIMs lies in establishing methods that allow customizing physicochemical properties of the materials while keeping the surface slipperiness unaffected, or vice versa.

Post modification methods represent a typical strategy to modify or tune the physicochemical properties after fabrication. Current modification methods are based on surface chemical modifications which are molecular-dependent and relies on specific chemical reactions, such as those in the reactive super-hydrophobic surfaces and reactive "liquid-like" surfaces. However, most chem- or bio-active agents are polar molecules and have poor compatibility with the substrates made from non-polar molecules, resulting in limited loading efficiency, and would thus suppress the performance of the multifunctional LIMs coatings. For instance, the existing approach for adding the antibacterial molecules to the liquid-infused material includes over-coating the antibacterial molecules on the surface of liquid-infused material. However, this would substantially affect the stability of the material by destabilizing the lubricating fluid infused therein. The surface morphology of the material would be altered as well.

Accordingly, there is a strong need to develop an improved composite in particular a liquid-infused material which is compatible to polar agents for achieving desired effects, or at least provide an alternative for application.

SUMMARY OF THE INVENTION

The inventors of the present invention provide a method of effective loading an ink preferably comprising a modifying agent on a porous material to form a repellent composite. In particular, the ink preferably comprising polar agents may be printed on the porous material with high precision to create a pattern.

In a first aspect, the present invention pertains to a method of preparing a composite, comprising:

a) providing a porous material comprising a polymeric network and a polar particle;
b) depositing an ink onto the porous material via a printing process; and
c) delivering a lubricating fluid to the porous material to form a coating.

In a second aspect, the present invention provides a composite obtained from the method, wherein an ink is sandwiched between a porous material and a lubricating fluid.

In a third aspect, there is provided an anti-fouling product comprising the composite.

The method is easy to operate and cost effective. It is also suitable for mass production. The resultant composite loaded with an antimicrobial molecule allows both passive and active disinfection.

Those skilled in the art will appreciate that the invention described herein is susceptible to variations and modifications other than those specifically described. The invention includes all such variations and modifications. The invention also includes all steps and features referred to or indicated in the specification, individually or collectively, and any and all combinations of the steps or features.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Other features and aspects of the invention will become apparent by consideration of the following detailed description and accompanying drawings.

FIG. 4d shows the results of the EDS analysis of the S3.5 substrate.

FIG. 4e shows the corresponding SEM and EDS mapping image of S3.5 substrate.

FIG. 4f shows the results of the EDS analysis of S7 substrate.

FIG. 4g shows the corresponding SEM and EDS mapping image of S7 substrate.

FIG. 7a is a plot showing the variation of the water contact angle on the typical printable porous material S3.5 sustained in acid and base solutions. FIG. 7b is a plot showing the variation of the water contact angle on the typical printable porous material S3.5 exposed in UV light (365 nm, 5 $mW/cm^2$) and in oven (100° C.). The surface hydrophobicity was unaffected and water contact angle was maintained around 110° C. under above treatments.

DETAILED DESCRIPTION OF THE EMBODIMENTS

Figure 1:
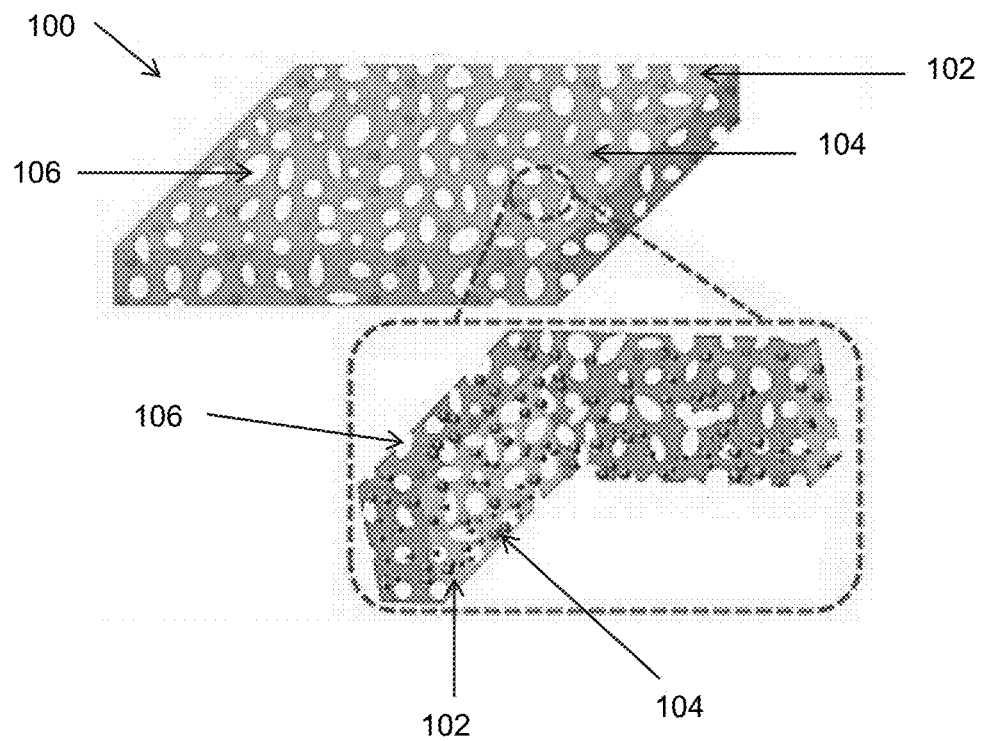
FIG. 1 is an illustrative diagram showing the porous material, i.e. substrate, of one embodiment of the present invention.

Unless otherwise defined, all technical terms used herein have the same meaning as commonly understood by one skilled in the art to which the invention belongs.

As used herein, "comprising" means including the following elements but not excluding others. "Essentially consisting of" means that the material consists of the respective element along with usually and unavoidable impurities such as side products and components usually resulting from the respective preparation or method for obtaining the material such as traces of further components or solvents. "Consisting of" means that the material solely consists of, i.e. is formed by the respective element. As used herein, the forms "a," "an," and "the," are intended to include the singular and plural forms unless the context clearly indicates otherwise.

The present invention provides a method of preparing a composite, preferably a liquid-infused material. The composite comprises a porous material infused with a lubricating fluid which provides a slippery and repellent surface for the composite. The porous material may be identified as a substrate for supporting the lubricating fluid. Accordingly, the term "porous material" has the same meaning as "substrate" as used throughout the description. The composite also comprises an ink which may form a pattern on the composite. The ink is sandwiched between the porous material and the lubricating fluid. The ink may comprise a modifying agent which modifies the physical or chemical properties of the porous material, and/or allows functionalization. The porous material preferably composed of both polar and non-polar components so that it is compatible to both polar and non-polar substances applied thereon. In particular, the porous material has a polymeric network and a polar particle.

In preferred embodiments, the polymeric network comprises or consists of polyethylene, or any other polyolefins including polypropylene, polyvinyl chloride, polyethylene terephthalate, polyvinylidene difluoride, poly(methyl methacrylate), polystyrene, nylon, polycarbonate, polytetrafluoroethylene. In a particular embodiment, the polymeric network comprises or consists of polyethylene with an average molecular weight of more than about 1,000,000 g/mol, from about 1,000,000 g/mol to about 3,000,000 g/mol, from about 1,000,000 g/mol to about 2,500,000 g/mol, from about 1,500,000 g/mol to about 2,000,000 g/mol, about 2,000,000 g/mol, or about 2,500,000 g/mol. The polyethylene is preferably ultrahigh-molecular-weight polyethylene (UHMWPE) having an average molecular weight of about 2,000,000 g/mol. UHMWPE has good biocompatibility, excellent chemical resistance and mechanical robustness.

The polar particle comprises silicon dioxide ($SiO_2$), mica, molybdenum disulfide, silicate, a metal oxide such as but not limited to $TiO_2$, $Al_2O_3$, $Fe_3O_4$, $CaCO_3$ or montmorillonoid, a carbon-based material such as but not limited to carbon black or carbon nanotube, and preferably is silicon dioxide particle. The polar particle may be present in nano-scale, i.e. with an average particle size of about 10 nm to about 500 nm, about 50 nm to 300 nm, about 100 nm to about 200 nm, or about 120 nm to about 150 nm. The polar particle may assist the formation of pores and improve the loading capacity of the porous material as well as other native properties provided by the nanoparticles.

Referring to FIG. 1, there is shown an embodiment of the porous material. The porous material 100 has a polymeric network 102 and polar particles 104. The porous material 100 has pores 106 densely and preferably uniformly distributed on the porous material 100. The porous material 100 is made up of a polymeric network 102 consisting of polyethylene with an average molecular weight of about 2,000,000 g/mol and silicon dioxide particles 104. The silicon dioxide particles 104 have an average particle size of about 120 nm. The porous material 100 is further processed to form a composite by the method of the present invention.

Turning to the method, it comprises the steps of:
a) providing a porous material comprising a polymeric network and a polar particle, as defined above;
b) depositing an ink onto the porous material via a printing process; and
c) delivering a lubricating fluid on the porous material to from a coating.

The step a) may further comprise steps of manufacturing the porous material. The porous material may be prepared by:
i) mixing a polymer in particular polyethylene with polar particles such as silicon dioxide particles preferably having an average particle size of 10 nm to 500 nm in a diluent to disperse the polymer and the polar particles evenly in the diluent, wherein the weight ratio of the polymer to the polar particles is 1:99 to 10:90, 1:99 to 7:93, or 1:99 to 5:95;
ii) subjecting the mixture to extrusion at a temperature of above 100° C. preferably above 200° C. to produce an extruded product;
iii) cutting the extruded product into granules;
iv) pressing the granules at about 100° C. to 300° C., about 100° to 200° C., or about 200° C. to obtain a film; and
v) removing the diluent from the film, preferably by using an alcohol such as but not limited to ethanol, acetone or n-hexane, to obtain the porous material.

Preferably, the weight ratio of the polymer to the polar particles is about 1:99 to 5:95, more preferably 3:97 to 5:95. In particular embodiment, the weight percentage of the polar particle is about 3% to 5% by weight, more preferably 3.5% by weight. In an embodiment, the silicon dioxide is provided in or partially attached to the polymeric network.

The term "diluent" as used herein refers to a chemical that does not dissolve the polymer at room temperature but dissolves it at high temperature thereby it creates a phase separation when there is a temperature change, i.e. known as "porogen". The removal of the diluent in step v) results in formation of pores in the porous material. In embodiments, the diluent is oil in particular a mineral oil. The weight percentage of the diluent to the total weight of the diluent, polymer and polar particle is about 50% to 80%, about 65% to 75%, or about 75%. "Mineral oil" used herein refers to a mixture of liquid hydrocarbons obtained from a non-animal or non-vegetable source and can include aliphatic, napthenic, aromatic, and/or paraffinic components. Preferably, the mineral oil is a non-polar C15-C40 alkane mixture having a viscosity of about 10 to 90 cSt, about 20 to 80 cSt, about 40 to 70 cSt, about 10 cSt or about 68 cSt at 25° C. It would be appreciated that mineral oil can be obtained commercially or synthesized from laboratory. The kinematic viscosity can be determined by a person skilled in the art, e.g. by glass capillary visometer.

The mixture of the polymer, polar particles and diluent prepared in step i) is preferably a homogenous mixture.

After the provision of the porous material, an ink is deposited on the porous material. The ink, in general, is hydrophilic and may be ordinary ink used to provide patterns on the surface of material. In some embodiments, the ink may be specifically made such as hydrochromic ink and thermochromic ink, or made to achieve specific purpose such as therapeutic purpose or detection purpose.

Preferably, the ink comprises a modifying agent which can modify the physiochemical properties of the composite, or allow functionalization. The functionalization allows the composite to exhibit a function, for example but not limited to antimicrobial activity, catalytic activity, binding activity, therapeutic activity, fluorescent activity or the like. In particular, the modifying agent is hydrophilic or polar. In an embodiment, the modifying agent is an antimicrobial agent which can inhibit the growth of microbes or kill them. The antimicrobial agent may be selected from the group consisting of an antibacterial agent, an antifungal agent, an anti-algae agent, an antiviral agent, and a combination thereof. For example, the antibacterial agent may comprise eleostearic acid, polymyxin B, silver ion, triclosan, quoroum sensing inhibitor or the like.

In another embodiment, the modifying agent is a therapeutic agent for achieving a therapeutic effect on a subject being in contact with the composite. It would be appreciated that more than one modifying agent may be loaded on the porous material according to the present invention.

The present invention is exceptionally suitable for preparing a composite containing a hydrophilic or polar modifying agent. The presence of both polar and non-polar components in the porous material enables the hydrophilic modifying agent to interact with the polar component and allows the lubricating fluid in particular hydrophobic lubricating fluid to be infused thereto, i.e. forming a repellent composite with a desired function or property. In embodiments where silicon dioxide is applied as the polar particle, it can improve the adhesion between the modifying agent or ink and the porous material.

Preferably, in step b), the ink is deposited on the porous material via a printing process in particular via inkjet printing. The printing step allows the user to produce a specific pattern such as text, image, or design on the porous material. In an embodiment where the ink comprises a modifying agent for functionalization, the printing process in particular inkjet printing provides more efficient and user-friendly approach to functionalize the composite. It further enables loading of more than one ink as well as more than one modifying agent on the composite.

In step c), a lubricating fluid is delivered to the porous material to form a coating. The "lubricating fluid" as used herein refers to a fluid capable of infusing into the pores of the porous material and lubricating it to provide a continuous surface. In an embodiment, the lubricating fluid may be identical to the diluent used in preparing the porous material. The lubricating fluid may be a mineral oil as defined above. In particular, the lubricating fluid is hydrophobic, and may be a mineral oil having a non-polar C15-C40 alkane mixture with a viscosity of about 10 to 90 cSt, about 20 to 80 cSt, about 40 to 70 cSt, about 10 cSt or about 68 cSt. The lubricating fluid may be delivered dropwise to the porous material. Alternatively, the lubricating fluid may be delivered to the porous material via immersing the porous material in a bath of lubricating fluid.

Figure 2:
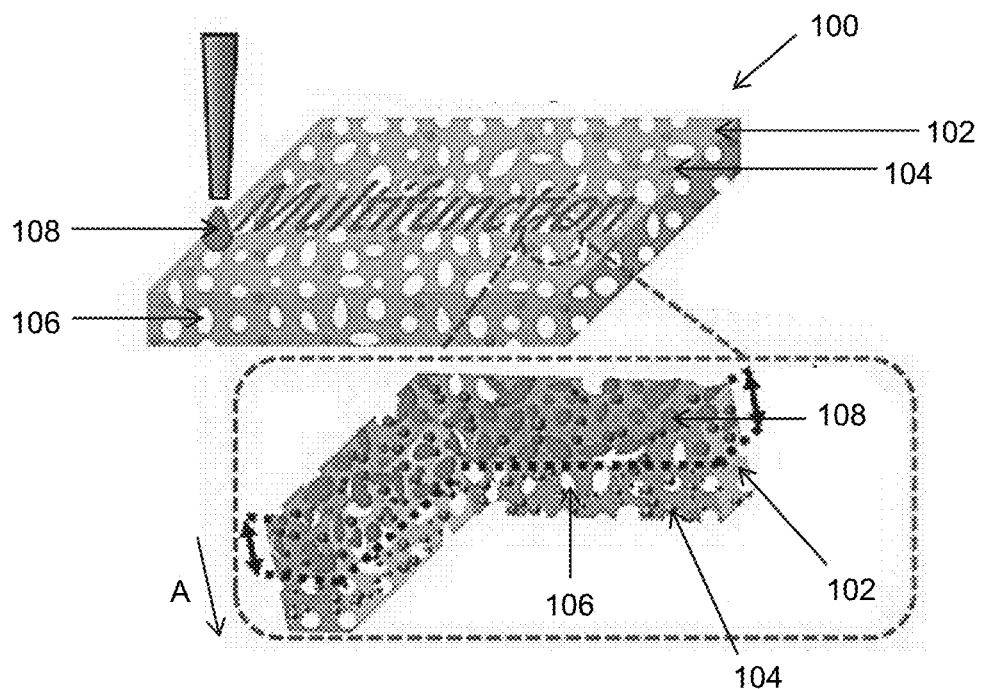
FIG. 2 is an illustrative diagram showing the structure of the porous material of FIG. 1 after addition of an ink.
Figure 3:
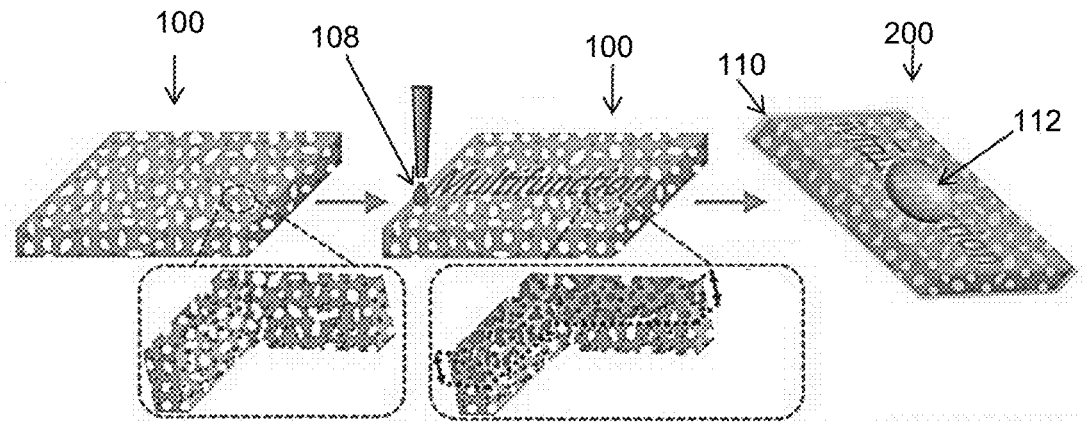
FIG. 3 is a diagram showing the steps of the method of one embodiment of the present invention.

Referring to a particular embodiment in FIGS. 2 and 3, an ink 108 is added dropwise on the porous material 100 to form a pattern in particular text "Multifunction" on the surface of the porous material 100. The ink 108 infuses to pores 106 positioned adjacent to the surface where ink 108 is applied, and preferably diffuse towards the surface opposite to the application surface along the direction indicated by arrow A. After that, a lubricating fluid is delivered to the porous material 100 to form a coating 110 on the porous material 100. The lubricating fluid has hydrophobic molecules and thus the resultant composite 200 has a repellent surface to repel water droplet 112 dropped on the surface.

The present invention also pertains to the composite as prepared according to the method described herein. The composite as prepared by the present invention can exhibit various functions depending on the ink in particular the modifying agent present in the ink. Accordingly, the composite can be used in a range of applications in chemical, environmental, engineering, biomedical related fields such as but not limited to antifouling coatings, food or medical packaging, surface patterning, controlled release administration of drug, or the like. Accordingly, the present invention pertains to use of the composite in manufacturing a product such as but not limited to a biomedical related device, an anti-fouling product, a food packaging film, a topical formulation, a paint, a coating or the like, and the product thereof. In an embodiment, the anti-fouling product is comprises a composite loaded with a thermochromic ink.

The inventors found that the method of the present invention can improve the loading modifying agent such as antimicrobial agent in the composite. The method may be regarded as a printing assisted post-modification of a liquid-infused material. The obtained composite possesses prominent surface slipperiness, self-report of wettability change, and stimuli-responsiveness.

The invention has been given by way of example only, and various other modifications of and/or alterations to the described embodiment may be made by persons skilled in the art without departing from the scope of the invention as specified in the appended claims.

EXAMPLES

Example 1

Preparation of the Composite

Materials: UHMWPE (average molecular weight: about 2,000,000 g/mol) was purchased from Shanghai Lianle Chemical Industry Science and Technology Co., Ltd., China. Mineral oils (non-polar alkane mixtures of C15 to C40 having viscosity of 68 cSt or 10 cSt) were obtained from Sinopec. $SiO_2$ (hydrophilic fumed silica; product code: A200; mean grain size: 120 nm disperse in ethanol) was supplied by Degussa. UHMWPE, mineral oils and $SiO_2$ were all industrial grade. Coumarin 6 (98%), nile red, which stained mineral oil and the ink deposit respectively for confocal observation were purchased from Sigma-Aldrich. Food coloring (McCormick) was used to aid visualization in videos and images. The hydrochromic ink (HIC, copper(II) chloride base) and thermochromic ink (238C, the core contents are thermochromic microcapsules with heat sensitive leuco-dye color developer and temperature controllers) were purchased from Shanghai Hengyuan Macromolecular Materials Co., Ltd. and Taipei New Prismatic Enterprise Co., Ltd. respectively.

Preparation of the porous material: Porous UHMWPE/SiO2 composites were prepared using thermally induced phase separation process (TIPS process) as described in L. Guy et al. Polymer 2016, 97, 63-68. UHMWPE powder and SiO2 nanoparticles were first blended with a mineral oil having a viscosity of 68 cSt using a digital dual-range mixer (RW20, IKA, Germany) and mixed at room temperature with 500 rpm for 2 h. The mass fraction of the mineral oil in all mixtures was fixed at 75 wt. % which served as porogen in the phase-separation process. The mass ratio of $SiO_2$/UHMWPE in different samples was different in a range from 1:99 to 7:93. In particular, 6 samples were prepared with the content of SiO2 in the substrate being 1 wt. %, 2 wt. %, 3.5 wt. %, 5 wt. % or 7 wt. %. Detailed recipe for preparing S0, S1, S2, S3.5 and S7 is provided in Table 1.

TABLE 1

Recipe for preparing S0, S1, S2, S3.5 and S7

| Substrate | Mineral oil wt % | $m(SiO_2)/m$ (UHMWPE) g/g |
|---|---|---|
| S0 | 75 | 0/100 |
| S1 | 75 | 1/99 |
| S2 | 75 | 2/98 |
| S3.5 | 75 | 3.5/96.5 |
| S7 | 75 | 7/93 |

The premixed mixture was poured into a conical twin-screw extruder at 220° C. in $N_2$ atmosphere with extrusion speed of 10 rpm. The extruded blend was cut into the master batch by using a plastic granulator followed by hot-pressing at 200° C. and 10 MPa for 15 min to obtain flat membranes with 400 μthickness. The mineral oil could be washed out by ethanol bath and recycled for further composite fabrication or lubrication.

Printing on the porous material: Printing on UHMWPE/$SiO_2$ substrates was performed by commercial-available ink-jet printer (L801, Epson, Japan) with original ink. Besides, two additional inks including the thermochromic ink and hydrochromic ink were also used for demonstration. The cross-section of printed samples was polished and then the ink penetration phenomenon was observed by metallurgical microscope (Olympus PMG3).

Example 2

Morphology and Physiochemical Properties of the Substrates

The surface morphology of the substrates was observed by using scanning electron microscope (SEM) (Philips XL30CP). The samples were coated with gold in a rarefied argon atmosphere (20 Pa) using an Emitech K550 Sputter Coater, with a current of 12 mA for 50 s. The element distribution and percentage of UHMWPE/$SiO_2$ substrates were analyzed by energy dispersive spectroscopy (EDS (Oxford Instruments INCA Energy 200). The thermal property of samples was measured by thermal gravimetric analysis (TGA) at a heating rate of 10° C./min. The tensile strength of the substrates was tested with an Instron machine at room temperature with a tensile speed at 5 mm/min. The initial gauge length and width were 50 mm and 10 mm respectively. Static water contact angle (WCA), sliding angle (SA), contact angle hysteresis (CAH) were measured with a customized system. Each WCA, SA or CAH value was averaged from five measurements made at different positions on the substrate surface. The optical images were obtained on a tilted glass platform with a Nikon D5500. The brightness and contrast of optical images were enhanced for clarity.

Figure 5A:
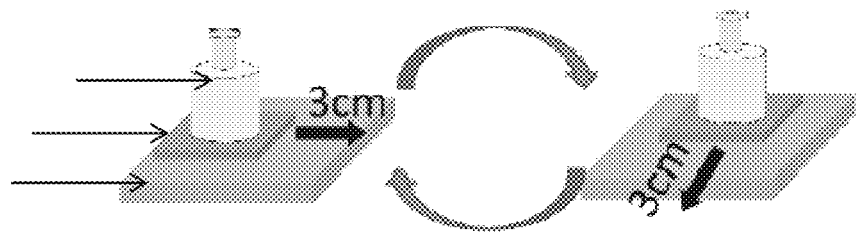
FIG. 5a is a schematic diagram of the abrasion testing process.
Figure 5B:
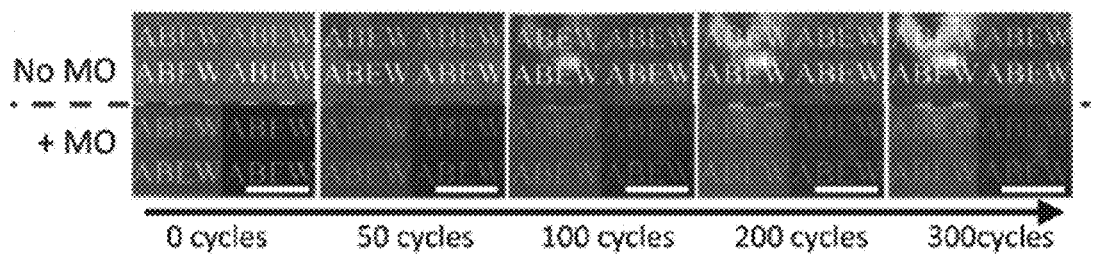
FIG. 5b shows images of Printed-S3.5 (upper row) and Printed-S3.5 infused with mineral oil (denoted as LIM-Printed-S3.5 (lower row) during the abrasion process.
Figure 5C:
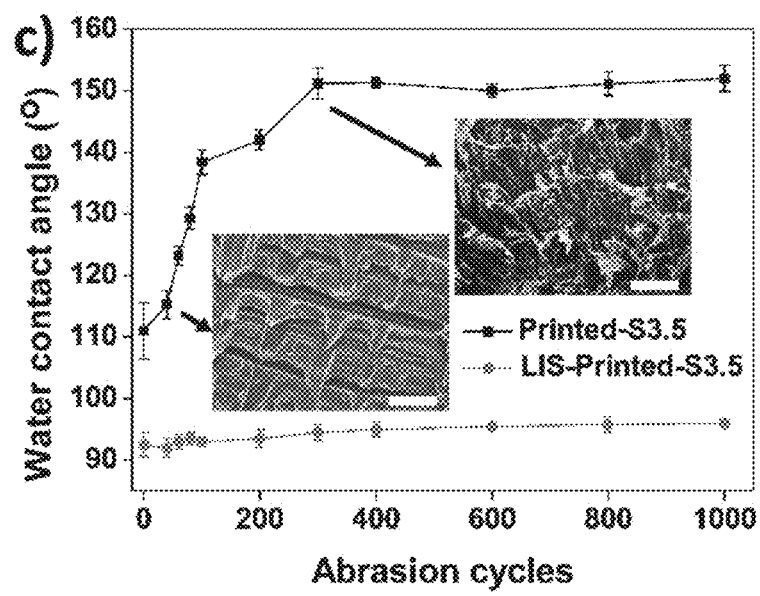
FIG. 5c is a plot showing the water contact angle (WCA) of Printed-S3.5 and LIM-Printed-S3.5 during the abrasion process, in which the inset SEM images showed the increase of roughness introduced by abrasion.
Figure 5D:
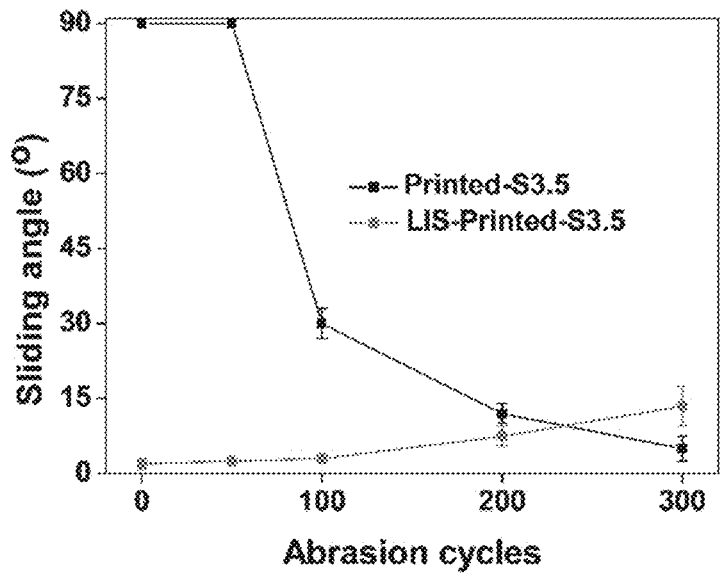
FIG. 5d is a plot showing the sliding angles of printed S3.5 and LIM-Printed-S3.5 during the abrasion process. (Scale bar: b, 1 cm; c, 100 μm).

Abrasion Tests were performed using sandpaper. The sample faced up sandpaper (grit no. 220). Sandpaper under a 500 g weight were moved for 3 cm by an external drawing force, the sample was rotated by 90° (face to the sandpaper) and then moved for 3 cm along the journey (FIG. 5a). This process is defined as one abrasion cycle, which guarantees the surface is abraded longitudinally and transversely in each cycle. After 50 abrasion cycles, the inventors renewed the sandpaper to maintain high roughness.

Acid and base solutions, including 98% sulfuric acid and 25% ammonia solution, were adopted to test the acid and base resistance. The as-prepared substrates were soaked in above mentioned solutions for 10 days at room temperature. The pH value of chemical baths was adjusted to be neutral with ammonia and acetic acid after soaking.

Results:

Since the UHMWPE and $SiO_2$ have distinct surface wettability and polarity, their weight ratio would affect the microstructure of the as-prepared substrates and thus the ink-retention after printing. Surface morphology on representative samples with varying weight percentages (wt) of $SiO_2$ nanoparticles, 0 wt %, 1 wt %, 2 wt %, 3.5 wt %, 5 wt % and 7 wt % (termed as S0, S1, S2, S3.5, S5 and S7.5, respectively) were presented in the upper row of FIG. 4a. Indeed, the micropores were densely and uniformly distributed in the S3.5 substrate, and the pore size and distribution became more random in the S7 substrate.

Figure 4A:
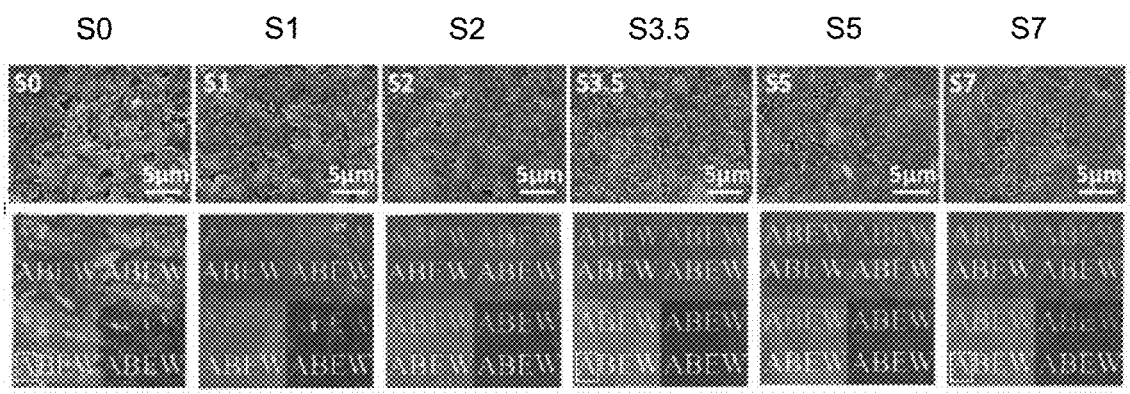
FIG. 4a demonstrates the surface morphology of the substrates with various $SiO_2$ content, i.e. 0wt %, 1 wt %, 2 wt %, 3.5 wt %, 5 wt % and 7 wt %. The substrates are respectively denoted as S0, S1, S2, S3.5, S5 and S7 according to the $SiO_2$ content. The lower row shows the ink-jet printing performance on the substrates with various $SiO_2$ content.
Figure 4B:
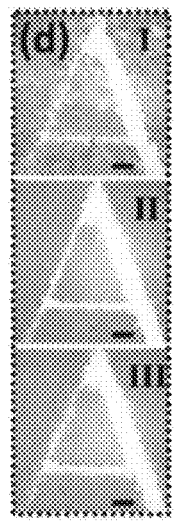
FIG. 4b shows the optical images for zoom-in area indicated by dashed box in FIG. 4a, in particular S0 (I), S3.5 (II) and S7 (II) at the lower row.
Figure 4C:
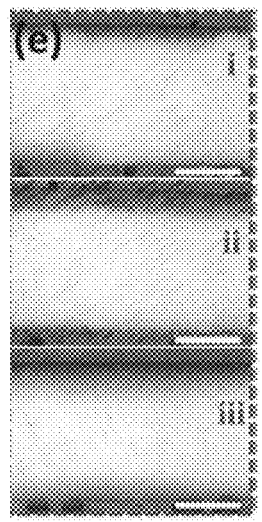
FIG. 4c shows the cross section of Printed-S0, Printed-S3.5 and Printed-S7 samples showing distinct ink penetration depth. Scale bar: (b) 5 µm; (c) 1 cm; (d) 300 µm; (e) 200 µm.

A standard printing test was performed on the as-prepared substrates using a commercial inkjet printer, refer to the lower row in FIG. 4a. The printed characters on S0 substrate were blurred and beyond recognition, and the printing quality was improved substantially on the S3.5 substrate. When further increasing the $SiO_2$ content, the printing quality would be suppressed as in the S7 substrate. The zoom-in observation on the printed pattern showed that the lateral spreading and the penetration of the polar ink varied on different composites, see FIGS. 4b and 4c. The ink droplets could penetrate slightly in the S0 substrate and stained on the surface with gel-like appearance which could be wiped away easily, indicating the poor compatibility between the non-polar UHMWPE and polar inks. In comparison, ink droplets penetrated more deeply into the S3.5 and S7 substrates due to the strong affinity provided by the polar $SiO_2$ nanoparticles.

FIG. 4d shows the results of the EDS analysis of the S3.5 substrate. FIG. 4e shows the corresponding SEM and EDS mapping image of S3.5 substrate. FIG. 4f shows the results of the EDS analysis of S7 substrate. FIG. 4g shows the corresponding SEM and EDS mapping image of S7 substrate. The green spots marked with red arrows indicated the phase-separation induced severe agglomeration of $SiO_2$ on S7 substrate.

Figure 6:
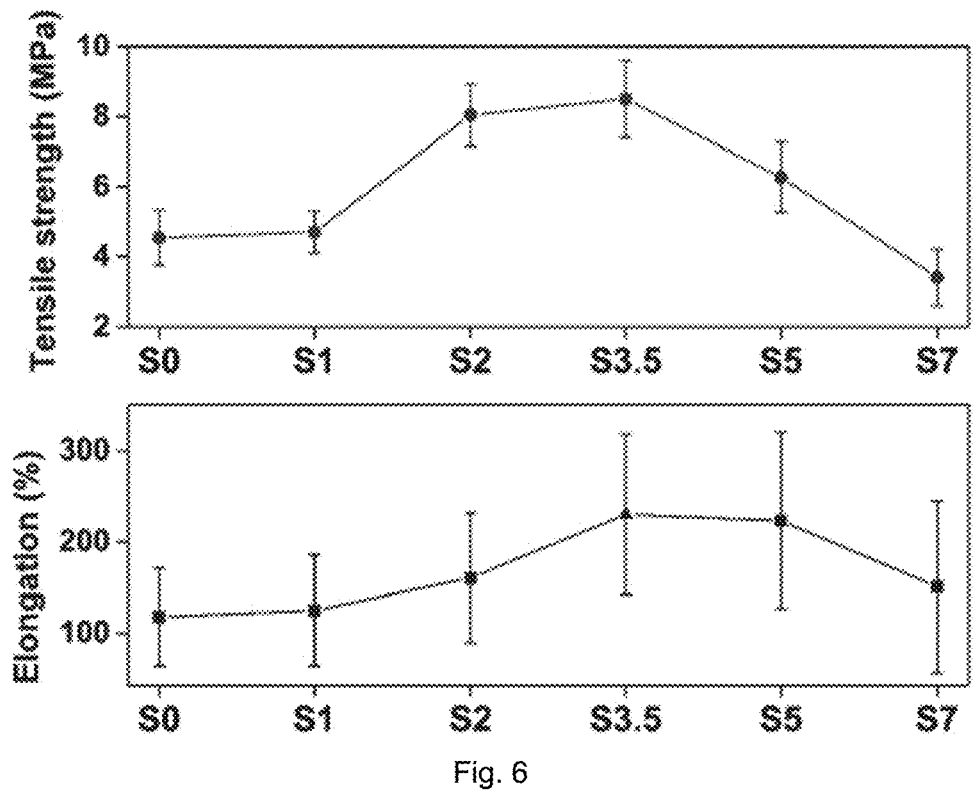
FIG. 6 provides two plots showing the tensile property of the composite SN. The addition of $SiO_2$ nanoparticles could improve the tensile strength of the composite, while the severe agglomeration of excessive $SiO_2$ will deteriorate the tensile property of composite.

With reference to FIGS. 5a-5d, abrasion testing was performed. The Printed-S3.5 was cut into two parts. The upper row in FIG. 5b (corresponding to Printed-S3.5) was the control without lubricant, and the lower row (corresponding to LIM-Printed-S3.5) was infused with mineral oil. The samples were abraded longitudinally and transversely in each cycle as demonstrated in FIG. 5a. After about 300 cycles, the abraded area of Printed-S3.5 became blurred and superhydrophobic owing to the increase of roughness (inset figure in FIG. 5c). The lower row, however, kept nearly the same appearance after abrasion for 300 cycles and had nearly the same WCA during abrasion for 1000 cycles. It was due to the lubricant layer which overcoated the composite. Accordingly, water can roll off easier and easier on abraded composite with the process of abrasion. As for the LIM-Printed-S3.5, the sliding angle increased slightly because the loss of lubricant caused by renewed sandpaper. According to the results, the lateral spreading and the penetration depth for S7 substrate was more random than that of S3.5 substrate, which might be attributed to the phase-separation induced severe agglomeration of $SiO_2$ on the composite. Actually, the penetration of the ink inside the composite determined the amount of materials that could be effectively loaded into the composite through the printing methods. The post-modified composites with deeper penetration of the ink can also endure more cycles in mechanical abrasion, see FIG. 6.

Figure 7A:
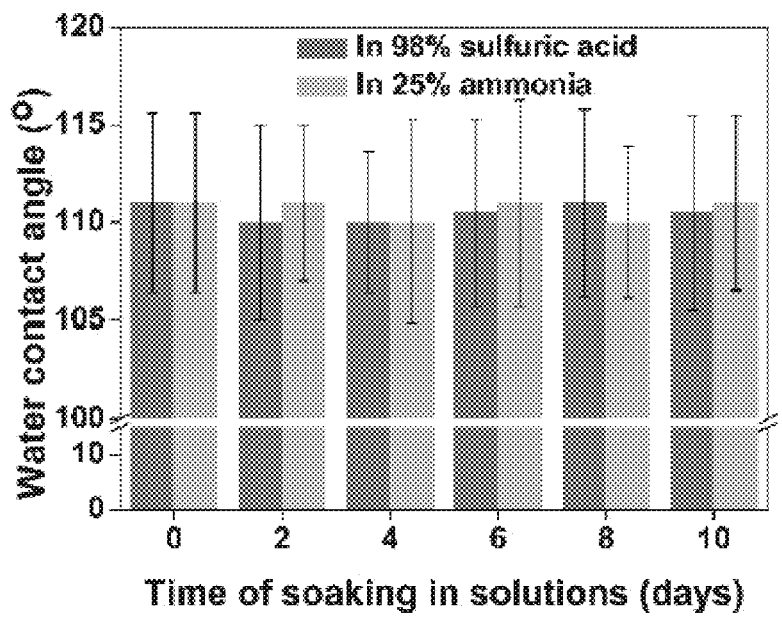
FIGS. 7a and 7b demonstrate the stability of the porous material prepared according to the present invention.
Figure 7B:
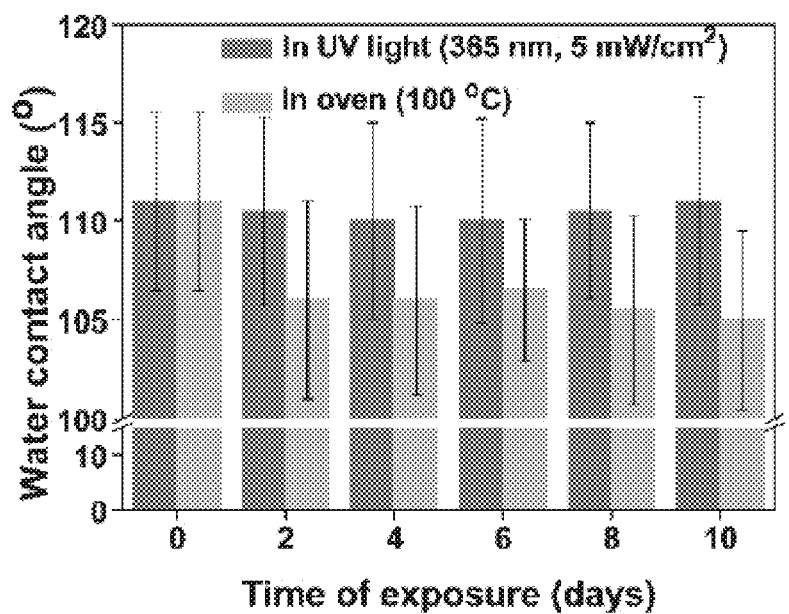
Figure 9A:
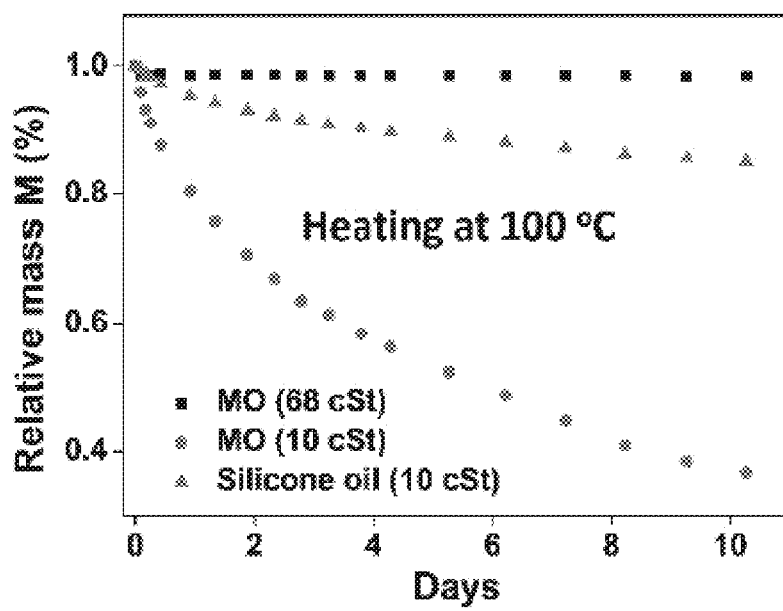
FIG. 9a is a plot showing the relative mass of different lubricants over days so as to determine the evaporation characteristics of lubricants—mineral oil at viscosity of 10 cSt, mineral oil at viscosity of 68 cSt and silicone oil at viscosity of 10 cSt.
Figure 9B:
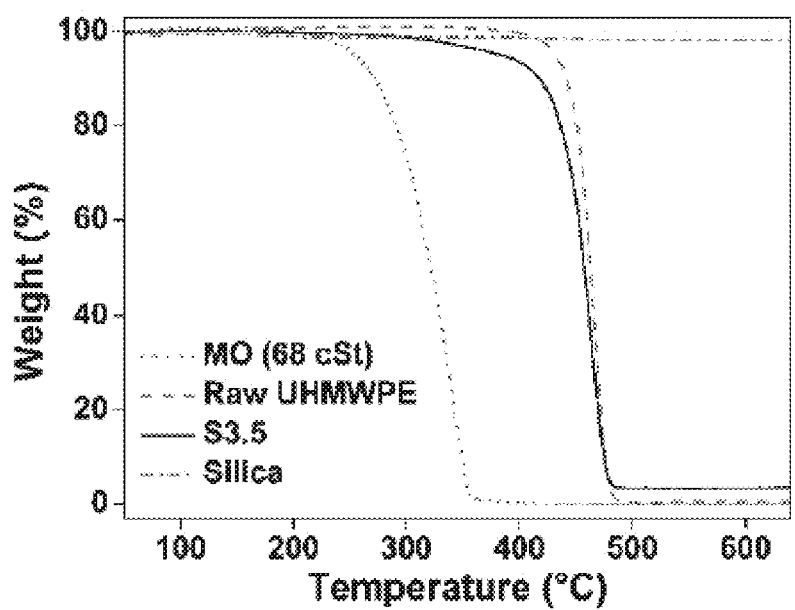
FIG. 9b is a plot obtained from thermogravimetric analysis (TGA) of S3.5 and raw materials, including UHMWPE, mineral oil and $SiO_2$. The 68 cSt mineral oil showed minimal evaporation rate and high decomposition temperature (around 230° C.), and brought high thermal stability to the lubricated composite.

The inventors then investigated the stability of the substrates. As shown in FIGS. 7a and 7b, the addition of $SiO_2$ nanoparticles could improve the tensile strength of the substrate. And they showed excellent stability under various conditions. As exemplified on the S3.5 substrate, the surface hydrophobicity was unaffected and water contact angle (WCA) was maintained around 110° C. under various treatments, for example, immersion in 98 wt % sulfuric acid and 25 wt % ammonia solution for 10 days, continuous UV irradiation and thermal treatment (in 100° C. oven) for 10 days, see FIGS. 9a-9b.

Example 3

Delivery of a Lubricating Fluid

To choose a suitable lubricant with a minimal evaporation rate and good compatibility to the composites, three kinds of lubricants, including mineral oils with viscosity of 68 cSt and 10 cSt, and silicone oil with viscosity of 10 cSt were selected for comparison. After forming a coating with the corresponding lubricant, the superfluous oil layer was removed by spinning at 1000 rpm for 2 min to obtain the samples. Shear stability tests were performed on the lubricant treated samples by using a water stirring bath. In particular, S3.5 composites (denoted as LIM-S3.5), i.e. the composites prepared with 3.5 wt % of $SiO_2$ according to the Example 1, (1×3 $cm^2$) lubricated with three kinds of fluorine free oils were immersed in 100 mL of water in a 100 mL beaker at a stirring speed of 400 rpm for 24 hours. The samples were then dried at 70° C. for 1 h for further measurement. The contact angle hysteresis was measured at different shearing time.

Figure 8A:
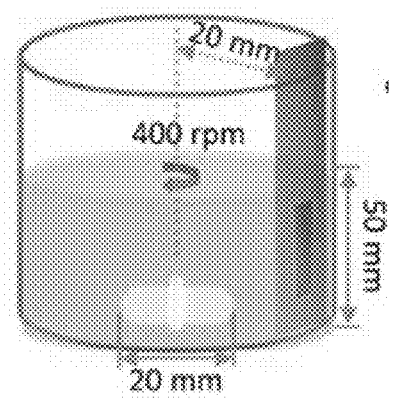
FIG. 8a is a schematic diagram of shearing-stability test in a stirring water bath.
Figure 8B:
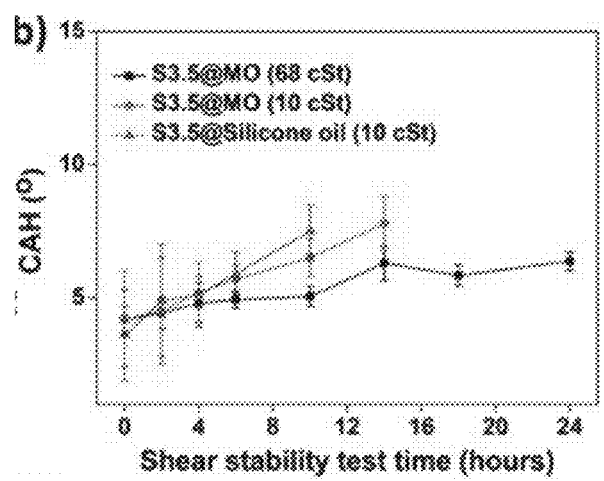
FIG. 8b is a plot showing the contact angle hysteresis (CAH) over time in a shear stability test of the composites infused with different lubricants.
Figure 8C:
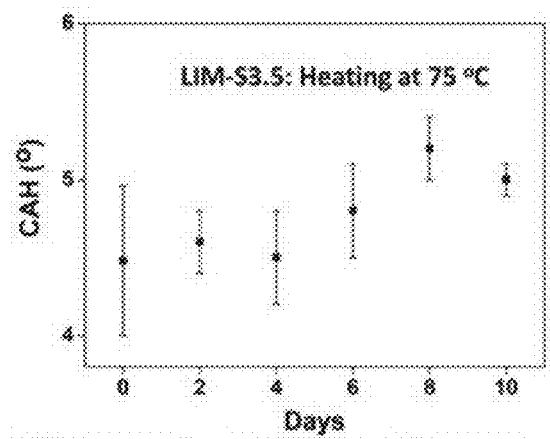
FIG. 8c is a plot showing the contact angle hysteresis (CAH) over days in a thermal stability test of LIM-S3.5 composite by using 68 cSt mineral oil as the lubricant.

FIG. 8a illustrates the experiment setup. Briefly, the lubricated sample (red) was immersed in water bath, in which a magnetic bar stirred at 400 rpm to apply a continuous shear flow on the sample surface. The contact angle hysteresis (CAH) of the sample was measured after various stirring periods of time. Indeed, all the samples showed increased CAH after the shear flow indicating the loss of the lubricant, but the sample coated with the 68 cSt mineral oil showed the best stability due to the enhanced viscosity and better compatibility with UHMWPE, see FIG. 8b. Moreover, the 68 cSt mineral oil showed minimal evaporation rate, and brought high thermal stability to the lubricated sample, with reference to FIG. 8c. Considering the overall performance of the composite and lubricating fluid, the 68 cSt mineral oil lubricated S3.5 composite was selected as representative sample.

Figure 8D:
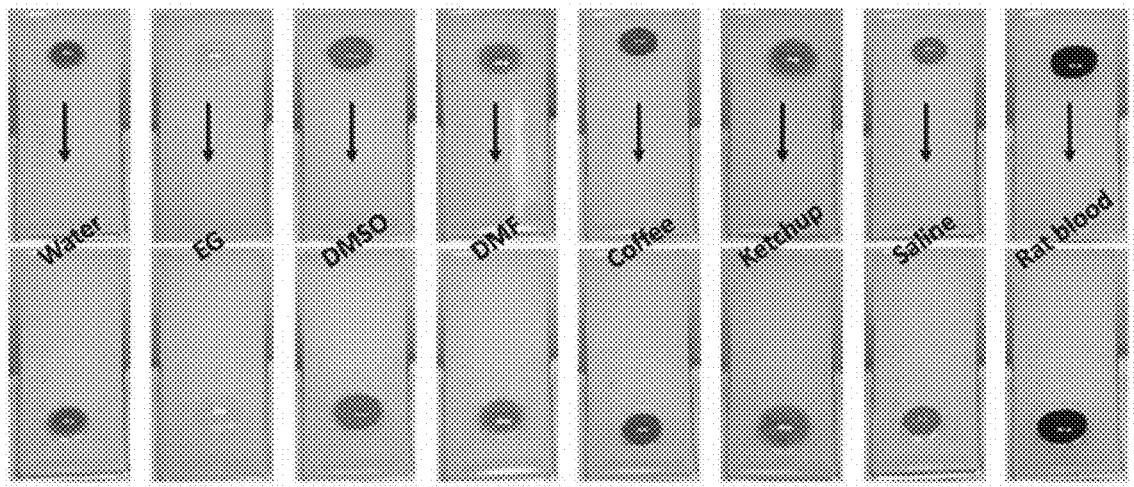
FIG. 8d are images showing the sliding of test liquids on the 68 cSt mineral oil lubricated composite.

The S3.5 composite lubricated with 68 cSt mineral oil (denoted as LIM-S3.5) exhibited excellent repellency to water, some organic solvents, food and medical fluids which are immiscible to the over-coated mineral oil, as shown in FIG. 8d.

Example 4

Anti-Fouling Effect of the Composite

*P. aeruginosa* colony on a solid Luria-Bertani (LB) agar plate was transferred to 10 mL of a liquid LB culture medium and grown at 37° C. for 12 h. This LB preculture was then seeded at 10% concentration in a liquid LB culture medium in 24-well plate containing samples of S3.5 substrate and LIM-S3.5 composite. These bacterial cultures were incubated with shaking at room temperature for 48 hours. Samples were removed from the wells using forceps, gently put on a paper towel to remove excess liquid, and placed in a new 24-well plate. The sample was gently washed 3 times each with 2 mL of normal saline. SEM was used to observe the attached bacteria with and without the above saline washing step. And the following steps were also conducted with and without this washing step to quantify the attached biofilm. Each sample was stained with 1 mL of a crystal violet (CV) solution (0.1% CV (w/v) in 95:5 water/ethanol) for 20 min. Excess CV stain was removed by washing twice with 2 mL of deionized water in each individual well, and the sample were thoroughly dried. Then, 0.5 mL of ethanol (95%) was added to the CV-stained samples and incubated with shaking for 2 h. Optical density (OD) measurements of 600 nm of the resulting solutions were taken by a plate reader. Each data point was obtained from three independent samples.

Samples after bacteria adhesion tests were treated with standard procedure of fixation and dehydration prior to the Environmental Scanning Electron Microscope (ESEM) observation. Briefly, the bacteria covered samples were fixed with 1 mL 2.5% (v/v) glutaraldehyde solution for 5 h at 4° C. The samples were washed in deionized water and dehydrated with an ascending sequence of ethanol solutions (30%, 50%, 75%, 90%, 95%, 100%, 100%), each for 10 min. The samples were then vacuum-dried before sputter coating with gold for ESEM analysis (FEI Quanta 450 FEG)

Toxicity Screening: Cultures of 1% *P. aeruginosa* in LB culture medium were grown in duplicate in the presence of 1% (v/v) mineral oil and 1% (w/v) SLI-S3.5. 1% *P. aeruginosa* in LB culture medium was cultured as control sample. All samples were incubated in an orbital shaker at 37° C. at 250 rpm. OD600 was measured by a Eppendorf BioPhotometer 6131 Spectrophotometer.

Figure 8E:
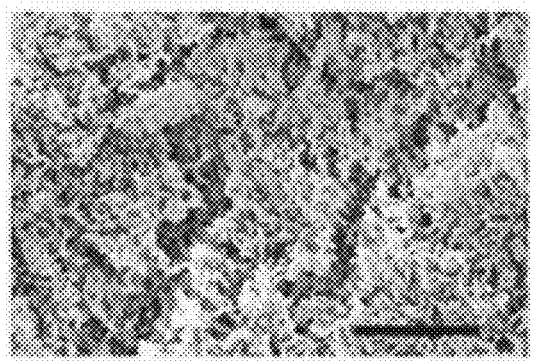
FIG. 8e is a SEM image showing the bacteria coverage on the S3.5 substrate before washing by saline solution.
Figure 8F:
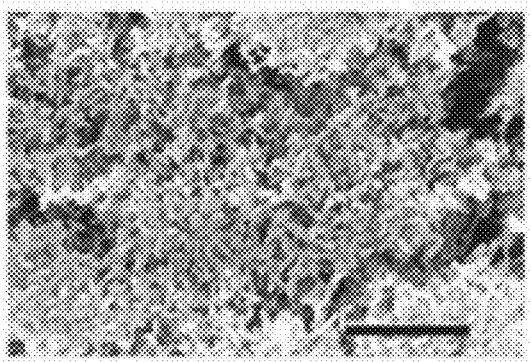
FIG. 8f is a SEM image showing the bacteria coverage on the S3.5 substrate after washing by saline solution.
Figure 8G:
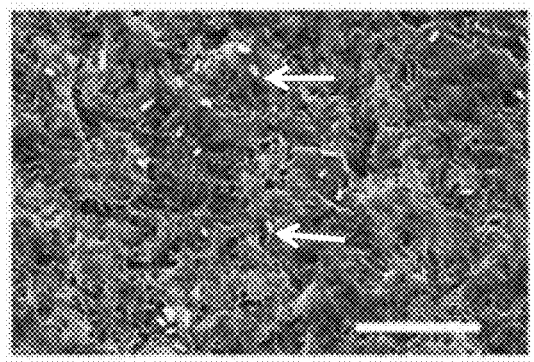
FIG. 8g is a SEM image showing the bacteria coverage on the LIM-S3.5 composite before washing by saline solution.
Figure 8H:
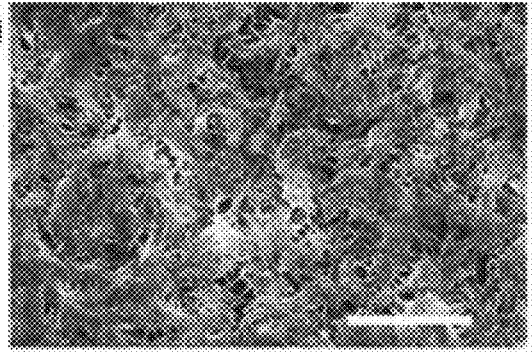
FIG. 8h is a SEM image showing the bacteria coverage on the LIM-S3.5 composite after washing by saline solution. Scale bar: 5 μm.
Figure 8I:
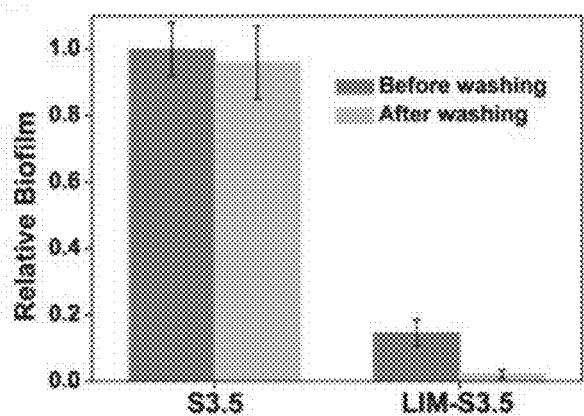
FIG. 8i is a plot showing the relative bacteria adhesion of S3.5 substrate and LIM-S3.5 composite through crystal violet staining. Result from S3.5 was recommended as 1 for normalization and comparison.

Results: The anti-biofouling property of LIM-S3.5 was demonstrated by using *P. aeruginosa* as a model system. The samples of bare S3.5 and lubricated LIM-S3.5 were immersed in the culture medium of *P. aeruginosa* for 48 h to allow bacteria adhesion. The densely covered bacteria cells on the S3.5 sample could not be washed out with saline, indicating strong bacteria adhesion (FIGS. 8e-8f). In comparison, only few bacteria cells were found on the surface of the LIM-S3.5 sample, and those cells could be easily removed under gentle saline washing, indicating reduced bacteria adhesion (FIGS. 8g-8h). Quantification study was carried out by crystal violet staining on the bacteria adhered samples followed by absorbance measurement at 590 nm. As shown in FIG. 8i, the LIM-S3.5 sample after gentle saline washing indicated a 98% decrease on the bacteria adhesion comparing to the S3.5 sample.

Figure 8J:
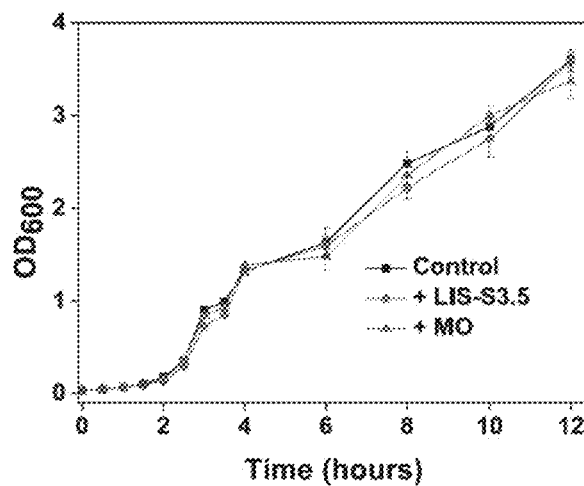
FIG. 8j shows the indistinguishable growth curves of *P. aeruginosa* cultured in shaken L-B media containing mineral oil and LIM-S3.5, comparing to control group.

A comparative test was performed by culturing *P. aeruginosa* in shaken L-B media containing mineral oil and LIM-S3.5, comparing to control group. Both mineral oil and LIM-S3.5 showed no inhibition on *P. aeruginosa* growth. Thus, the non-adhesion of bacteria on LIM-S3.5 was attributed to the mineral oil layer worked as a slippery interface between composite and bacteria. The results are shown in FIG. 8j.

Figure 8K:
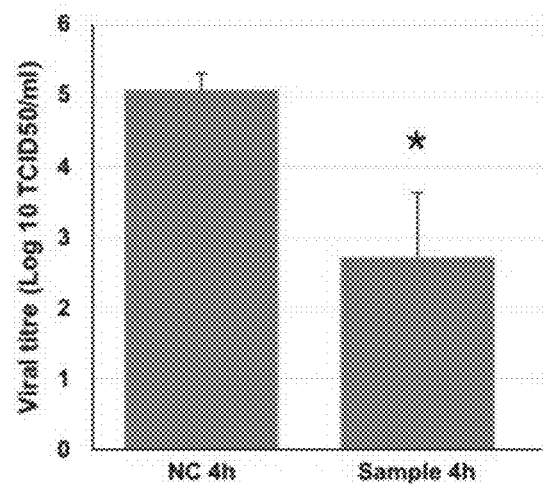
FIG. 8k is a plot showing the disinfection performance of Zika virus on the composite incorporated with photosensitizer nanoparticles of the present invention compared with a liquid-infused material existing in the market. The composite of the present invention achieves >99.5% Zika virus inactivation after 4 h visible light illumination.

The inventors further demonstrated the disinfection performance of the composite against Zika virus. FIG. 8k shows the results of a test composite incorporated with photosensitizer nanoparticles (titanyl phthalocyanine, porphyrin, hematoporphyrin monomethyl ether, 5,10,15,20-tetra-(N-methyl-4-pyridyl)porphyrin, meta(tetrahydroxyphenyl)chlorin) compared with a control composite without the photosensitizer nanoparticles. The test composite is capable of inhibiting >99.5% of Zika virus after 4 h visible light illumination. The photosensitizer nanoparticles here can generate reactive oxygen species or oxygen radicals which could damage the virus membranes for rapid virus disinfection.

Example 5

Stability of the Printed Patterns on the Composite

Figure 10A:
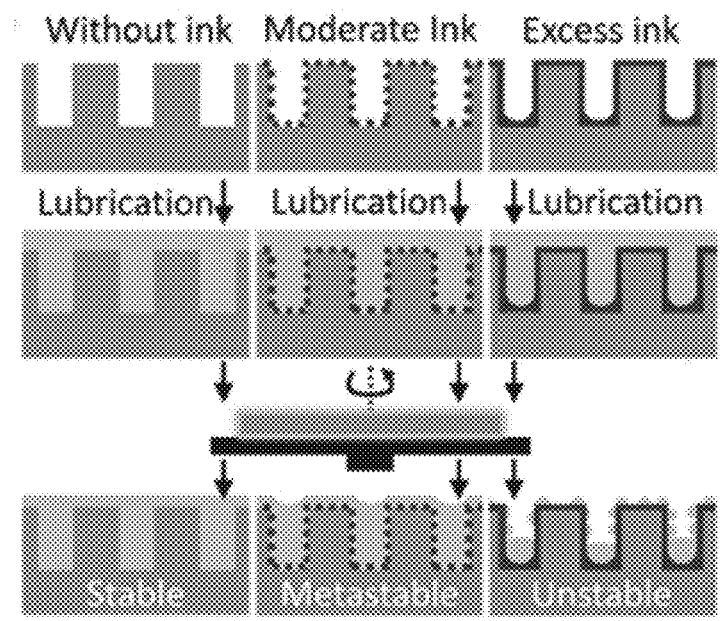
FIG. 10a is a schematic diagram illustrating the affinity evaluation of lubricant to substrates with various ink coverage. A spinning method was used to induce lubricant depletion.
Figure 10B:
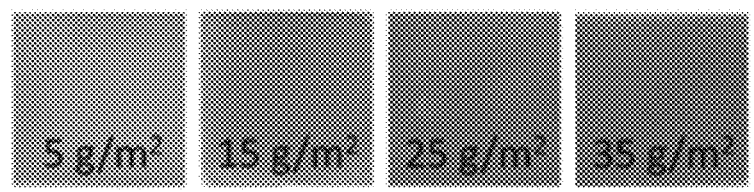
FIG. 10b shows images of the substrates printed with different amounts of inks followed by lubrication.
Figure 10C:
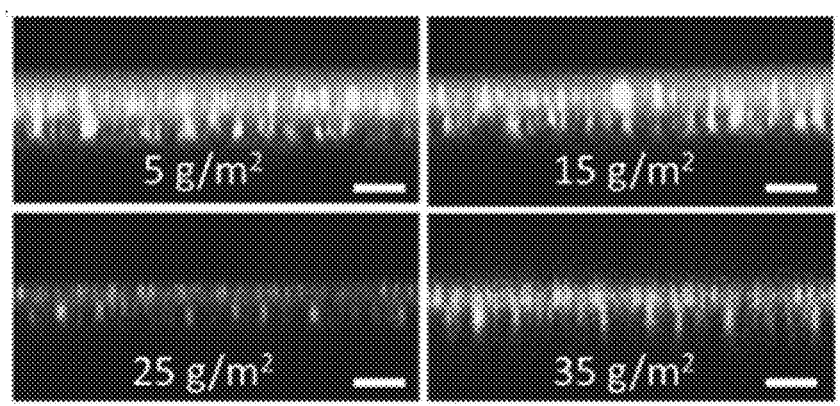
FIG. 10c shows confocal microscope images on the oil layer retained on the composite after spinning tests. Green corresponds to mineral oil, red corresponds to the printed ink, and yellow corresponds to the overlap of the two colors, respectively. Scale bar: 40 μm.

Besides of the normal commercial ink used above, the inventors loaded inks with specific properties into the composites to realize various functions, for example, controlled surface slipperiness, self-reporting on the loss of liquid repellency, sensing the temperature of contacting liquids. All the inks used here are commercial-available. The inventors first loaded hydrochromic inks into the nanocomposite to tune the surface wettability and slipperiness. Because the inks are composed of polar and hydrophilic molecules which have less affinity to the non-polar mineral oil, the inventors believes that the ink coverage would affect the stability of the overcoated mineral oil on the printed nanocomposites which could accessed via the spinning method (FIG. 10a), in which the centrifugal force could help remove the unstable lubricant. By screen printing hydrochromic ink on the S3.5 substrate with varying loading amount from 5 g/m$^2$ to 35 g/m$^2$, the substrates turned into vivid blue with enhanced saturation (FIG. 10b). By labelling the printed ink and oil layer with different dyes, distribution of the retained oil layer could be investigated by confocal microscopy. As shown in FIG. 10c, the retained oil layer on the S3.5 with 5 g/m$^2$ ink-loading had the largest thickness around 20 µm.

Figure 10D:
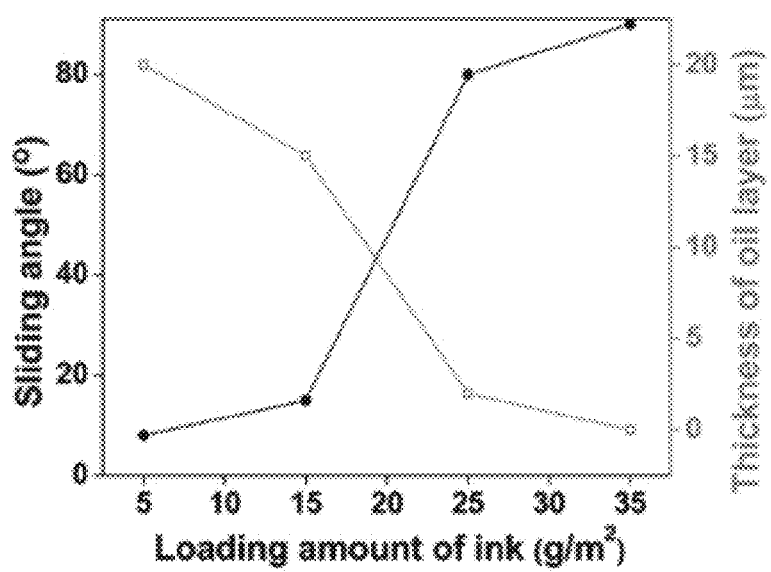
FIG. 10d is a plot showing the relationship between the sliding angle, loading amount of ink and the thickness of the oil layer.
Figure 10E:
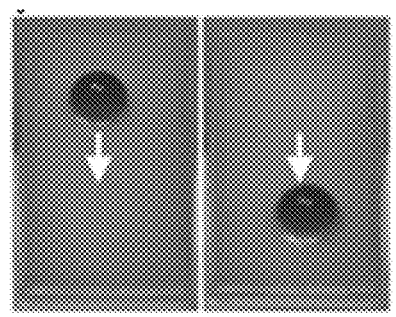
FIG. 10e demonstrates the sliding of dyed water on the composite printed with moderate inks.
Figure 10F:
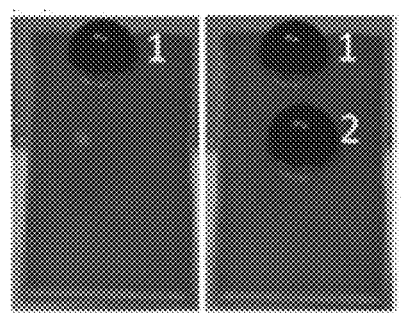
FIG. 10f demonstrates how the water droplets were pinned on a composite printed with excess inks.

With the increase of ink loading amount, the retained oil layer got thinner, indicating the reduced affinity and weak stability of mineral oil on those substrates. Specifically, the retained oil could not form a uniform layer to cover the S3.5 printed with 35 g/m$^2$ inks. This is caused by the incompatibility between the polar ink and the non-polar mineral oils. With the increase of ink loading, the ink covered area showed reduced affinity to the mineral oil, and thus the overcoated oil layer will rapture under the disturbances of spinning (FIG. 10a). Following sliding angle measurements confirmed the loss of the lubricant on those surfaces that the water sliding angle decreased with the increase of ink loading (FIGS. 10d-10f).

Then, the inventors demonstrated the self-reporting on the change of surface slipperiness on the printed substrates. The surface slipperiness and the liquid repellency of the composites could be lost when the overcoated lubricant could not be maintained on the substrate under different disturbances, for example, evaporation and shear flow. It is critical to monitor the longevity of the composites in actual applications such as anti-fouling and heat-transfer, so that users could replenish the lubricant or repair the materials to refresh the surface slipperiness.

Figure 11A:
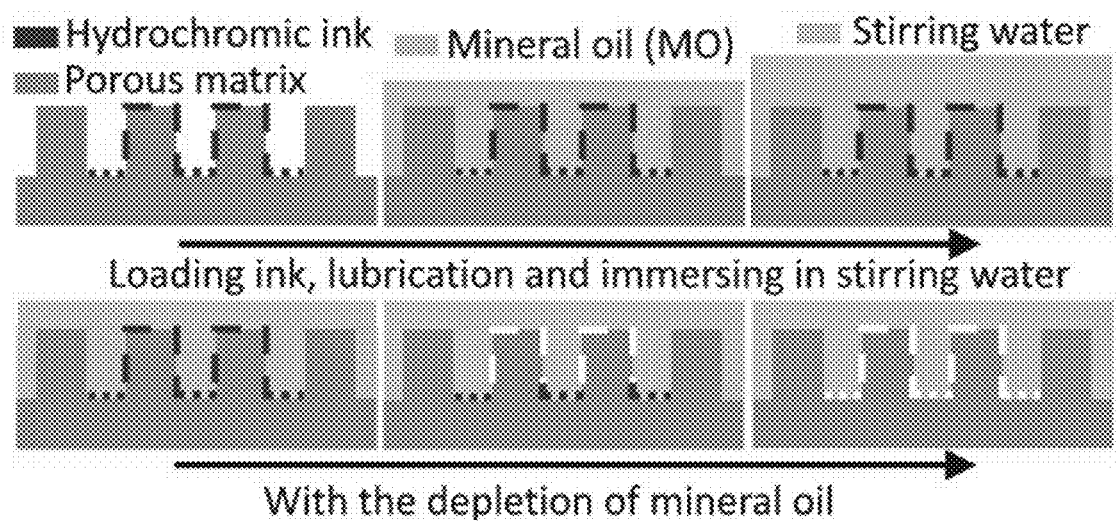
FIG. 11a is a schematic diagram showing the self-reporting surface slipperiness of LIM-Printed-S3.5 with hydrochromic ink.
Figure 11B:
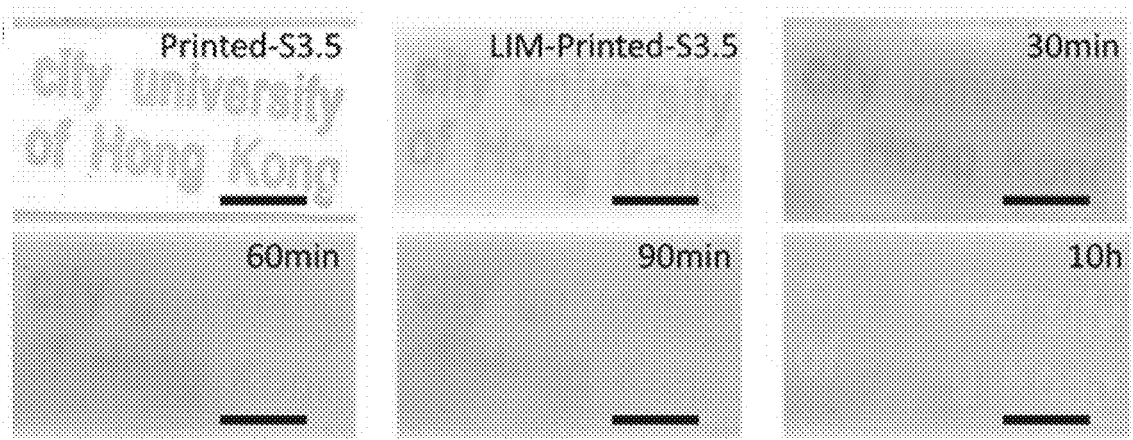
FIG. 11b are images obtained after printing the S3.5 substrate, infusing the substrate with mineral oil to form the printed S3.5 composite (LIM-Printed-S3.5), and after subjecting the printed composite to stirring water. With time passing by, the pattern gradually turned colorless after 10 h. Scale bar: 5 mm.

Currently, systems that could report the depletion of lubricant and the loss of slipperiness are very rare. By printing hydrochromic inks onto the nanocomposites, the rapture of overcoated lubricant and thus the change of surface slipperiness could be self-reported, when the composites were used in aqueous environments. FIG. 11a exhibited a proof-of-concept demonstration of self-reporting. Appropriate amount of hydrochromic inks were screen printed on S3.5 with a "City University of Hong Kong" pattern. As shown in FIG. 11b, the ink loading amount was about 5 g/m$^2$ so that a stable overcoated lubricant layer could be retained on the printed substrate. Then the lubricated sample was put in the water stirring bath to accelerate the depletion of mineral oil. Within 90 mins, the blue pattern got blurred indicating the gradual rapture of the oil layer. And after 10 h, the whole blue pattern vanished and turned into colorless, indicating the penetration of water into the substrate and thus the loss of the surface slipperiness.

Figure 12A:
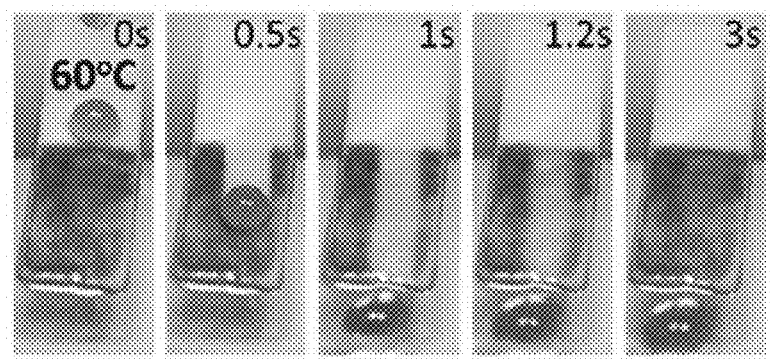
FIG. 12a shows dyed green water with 60° C. sliding on LIM-Printed-S3.5 loaded with a thermochromic ink, and left colorless pathway.
Figure 12B:
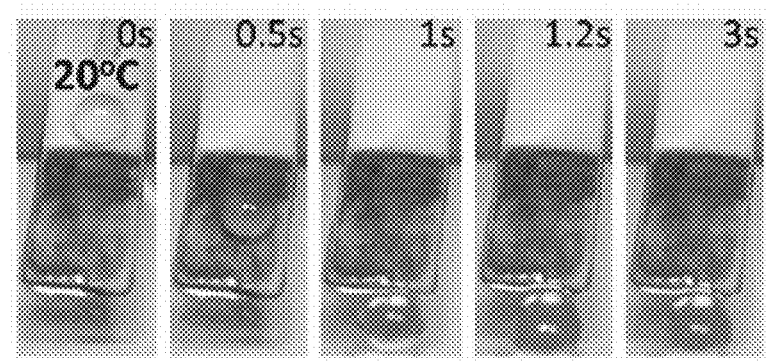
FIG. 12b shows dyed yellow water with 20° C. sliding on LIM-Printed-S3.5 loaded with a thermochromic ink, and did not trigger the color change.
Figure 12C:
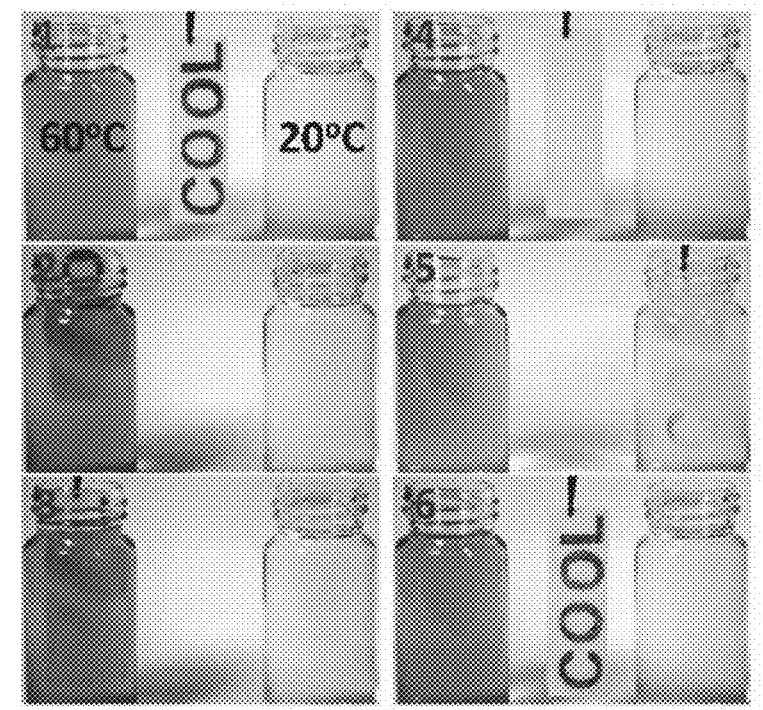
FIG. 12c demonstrates how the red pattern "COOL" disappeared when the substrate was immersed in water with 60° C., and appeared when the substrate was immersed into water with 20° C.
Figure 13A:
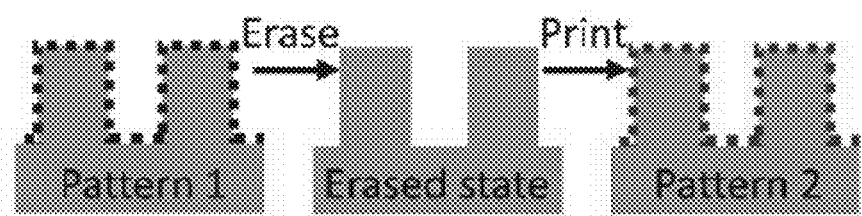
FIG. 13a is a schematic diagram showing the recycle and reuse of the composite.
Figure 13B:
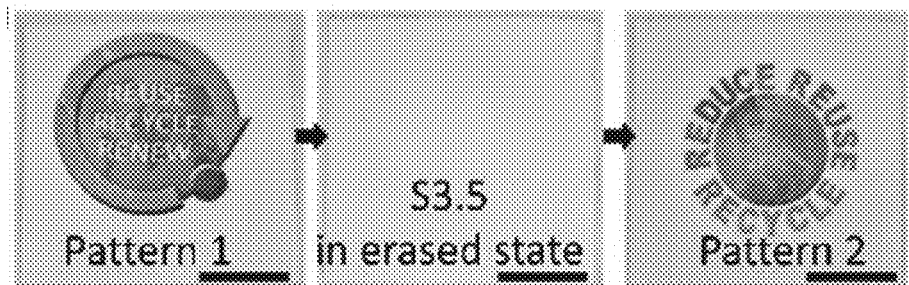
FIG. 13b demonstrates a printing-and-erase process on the composite. In particular, inks in Printed-S3.5 can be removed and erased by sonication in ethanol or acetone for recycle and reuse. Scale bar: 1 cm.
Figure 13C:
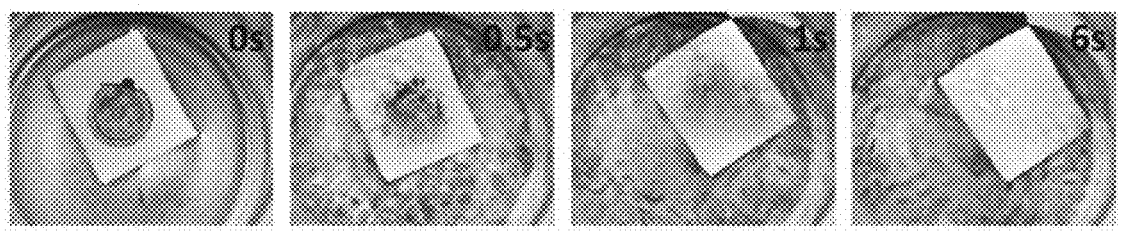
FIG. 13c demonstrates how the ink on the composite S3.5 can be removed and erased by sonication in acetone within 6 seconds.

By loading thermochromic ink, the system can indicate the temperature of contacting liquids. As a proof-of-concept demonstration, the thermochromic ink which will turn from red to colorless when its temperature is above 30° C., was printed onto the S3.5 composite. On the sample lubricated with mineral oil, namely, LIM-Printed-S3.5, hot (dyed green, 60° C.) and cool (dyed yellow, 20° C.) water droplets could slide readily (FIGS. 12a-12b). The substrate on the sliding pathway of the hot droplet turned into colorless due to thermal responsiveness of the printed thermochromic ink (FIG. 12a). In comparison, the contact and sliding of the droplet with lower temperature would not trigger the color change on the printed thermochromic ink (FIG. 12b). The thermal induced color change is reliable and can be repeated for many times, which could be useful in the development of non-fouling sensors. As demonstrated in FIG. 12c, the printed pattern "COOL" on the LIM-Printed-S3.5 sample disappeared when the substrate was immersed in hot water and appeared when the substrate was immersed in cold water. During the whole process, the surface of the substrate was not contaminated by the dyed water solutions. Moreover, inks printed in composite could be removed and erased by simple sonication in ethanol or acetone, as shown in FIGS. 13a-13b. Such cleaning process would not affect the microstructure of the composite and thus the printing resolution, allowing the reuse and recycle of the nanocomposites in ink printing and surface patterning, see FIG. 13c.

Conclusion

The composites of the present invention are stable and mechanically robust, and they could repel various fluids after lubrication. More functions could be integrated by loading different molecules. By using printing methods, the inventors successfully demonstrated the tunability on surface wettability of the composite, as well as the integration of new properties into the composite by selecting desirable inks, for example, controlled surface slipperiness, self-reporting on the loss of liquid repellency, sensing the temperature of contacting liquids. The present invention could be applied in the development of multifunctional liquid-infused materials that could synergize the fluid repellency and the physicochemical properties of the material for specific purposes such as applications in anti-fouling coating, food/medical packaging, smart windows and sensors.

The invention claimed is:
1. A method of preparing a composite, comprising:
a) providing a porous material comprising a polymeric network incorporated with a polar particle, wherein a weight ratio of polymer to polar particle of the porous material is 1:99 to 10:90;
b) depositing a hydrophilic ink onto the porous material via a printing process, wherein the hydrophilic ink infuses into the porous material by diffusing towards a surface opposite to an application surface due to an affinity with the polar particle; and
c) delivering a lubricating fluid comprising hydrophobic molecules to infuse the porous material and form a coating thereon.

2. The method of claim 1, wherein the polymeric network comprises polyethylene with an average molecular weight of more than 1,000,000 g/mol.

3. The method of claim 1, wherein the polar particle comprises silicon dioxide, mica, silicate, or montmorillonoid.

4. The method of claim 1, wherein the hydrophilic ink comprises a modifying agent for functionalizing the porous material.

5. The method of claim 4, wherein the modifying agent is an antimicrobial agent selected from the group consisting of an antibacterial agent, an antifungal agent, an anti-algae agent, an antiviral agent, or a combination thereof.

6. The method of claim 1, wherein the composite comprises more than one ink.

7. The method of claim 1, wherein the hydrophilic ink in step b) is deposited via inkjet printing.

8. The method of claim 1, wherein the lubricating oil is a mineral oil with a viscosity of about 10 cSt to 90 cSt at 25° C.

9. The method of claim 1, wherein the porous material is prepared by:
   i) mixing the polymer with silicon dioxide particles in a diluent to disperse the polymer and the silicon dioxide particles evenly in the diluent;
   ii) subjecting the mixture to extrusion at a temperature of above 100° C. to produce an extruded product;
   iii) cutting the extruded product into granules;
   iv) pressing the granules at about 100° C. to 300° C. to obtain a film; and
   v) removing the diluent from the film to obtain the porous material.

* * * * *